Patented Oct. 1, 1929

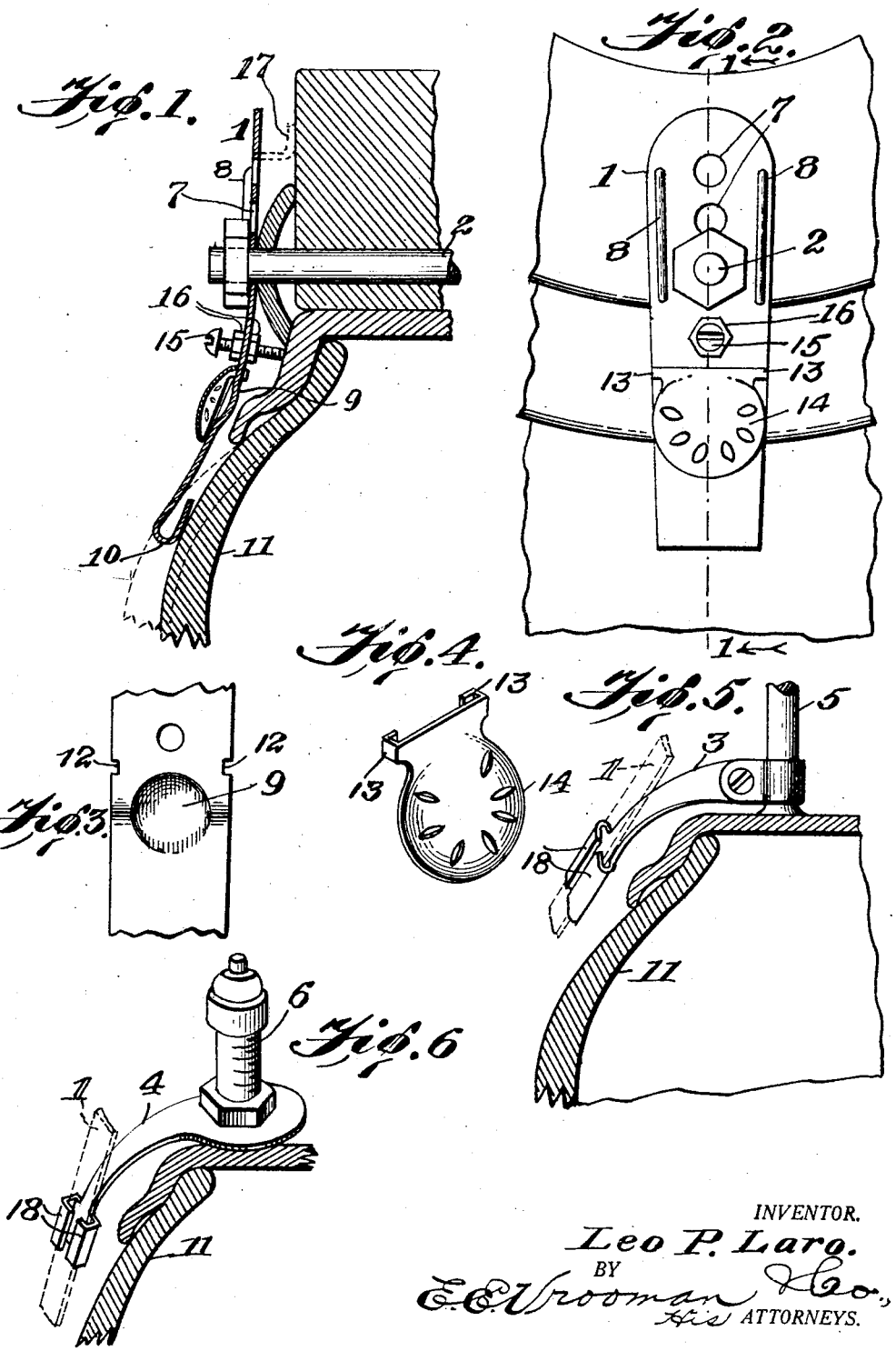

1,729,619

UNITED STATES PATENT OFFICE

LEO PAUL LARO, OF FRESNO, CALIFORNIA

AUTOMOBILE TIRE-DEFLATION ALARM

Application filed December 4, 1928. Serial No. 323,618.

This invention relates to an automobile tire deflation alarm.

The object of my invention is to provide a simple and efficient alarm to warn the driver of the motor vehicle of low tire pressure, when the motor vehicle is in motion.

Another object of the invention is the construction of a tire deflation alarm, which is adjustable for accurately giving off an alarm, when a tire is not inflated properly, my alarm is "sounded" before other means warns the driver, such as hampered steering or jolting sounds. My alarm can be set at any point of pressure that is found desirable.

This alarm is an improvement upon the one shown in my allowed United States application, Ser. No. 270,963, and some of the advantages over my original alarm are compactness, simplicity of manufacture and neatness of appearance, these advantages making for economy in production and distribution, with resultant lower cost to purchaser.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 1 is a sectional view of my device, applied to a motor vehicle and taken on line 1, 1, Figure 2.

Figure 2 is a front view, in elevation, of my device.

Figure 3 is a fragmentary front view of the primary element or "lever" of my device.

Figure 4 is a perspective view of the sound amplifier of the device.

Figure 5 is a perspective view of a bracket, for supporting my device, shown on a wire spoke, as found, for instance, in the new type of a Ford automobile.

Figure 6 is a perspective view of another embodiment of a bracket, mounted on a tire valve of wheels built without lug or rim bolts.

Referring to the drawings by numerals, the primary element of my device, which I will hereinafter refer to as "lever" 1 (preferably made of spring steel) may be mounted on the lug bolt or rim bolt 2, Fig. 1, or slidably supported on bracket 3, Fig. 5, or bracket 4, Fig. 6. Bracket 3 is fastened upon spoke 5, whereas bracket 4 is fastened on the tire valve 6.

The lever 1 is provided with a plurality of aligned apertures 7, in which the lug or rim bolt 2 is placed. A pair of substantially parallel, elongated corrugations or ribs 8 is formed upon lever 1 near its edges for reinforcing the sheet metal lever; these longitudinally extending ribs have the aperture 7 therebetween, as clearly shown in Figure 2. The lever is provided with a sound diaphragm 9. The outer end of lever 1 is bent back or inwardly as at 10, to prevent muffling the sound; this inturned end 10 normally bears against the tire 11.

Contiguous to the sound diaphragm 9 is a pair of transversely aligned notches 12, into which fit the inturned ears 13 of the sound amplifier 14; this sound amplifier is shown of a general dish shape, but the body thereof may be modified in design without departing from the spirit of the invention, provided the inturned ears and the notches on the lever are retained.

An adjusting bolt 15 is placed on the lever between the sound diaphragm 9 and the apertures 7 for obtaining an accurate adjustment, whereby my device is efficiently mounted on any type of a wheel and in contact with the tire thereof. The bolt 15 has lock nuts 16 thereon at opposite sides of the lever, and preferably engaging the lever. By adjusting the nuts 16, the inturned end of the lever can be placed closer to or further away from tire 11.

If desired, the inner end of lever 1 may be turned in at an angle, as shown by dotted lines 17, Fig. 1.

The sound producing diaphragm 9 is made to operate by pressure from the tire wall. When properly adjusted, the position of the diaphragm (which is merely an embossed disc in the lever) is convexed. Pressure from the tire wall causes the lever to bend across the diaphragm 9, which is its most flexible point, throwing the diaphragm into the opposite or concaved position producing a sharp click sufficient to warn the driver that the tire is under inflated. This action of the tire wall, as set forth in my co-pending application, Ser. No. 270,963, occurs only when the tire is sufficiently deflated to permit bulging of tire at point of contact with road. The diaphragm returns to its normal position of its own accord when pressure is removed.

The apertures 7 make it possible to attach my alarm to various type wheels. Adjusting bolt 15 permits of an adjustment ranging from complete deflation to a few pounds under complete inflation.

Each of the brackets 3 and 4 is provided with inturned flanges 18 between which the spring metal "lever" 1 is held; these brackets are accessories which make it possible to attach the alarm to various type wheels and in the following claims, I use the term "support" in a broad sense meaning either the rim bolt 2 or brackets 3 and 4, because generically, the lever is adjustably mounted on the bolt 2 or brackets 3 and 4.

While I have described the preferred embodiment of my invention and illustrated the same in the accompanying drawings, certain minor changes or alterations may appear to one skilled in the art to which this invention relates, during the extensive manufacture of the same, and I, therefore, reserve the right to make such changes or alterations as shall fairly fall within the scope of the appended claims.

What I claim is:

1. In a device of the class described, the combination with a support, of a spring lever on said support, said lever provided with a sound diaphragm and with an adjusting bolt, and means for locking said adjusting bolt in different adjusted positions upon said lever.

2. In a device of the class described, the combination with a support, of a spring lever on said support, said lever provided with a sound diaphragm near its outer end, an adjustable bolt extending through said lever between said support and said sound diaphragm, and means at opposite sides of the lever and engaging the bolt for locking the bolt in an adjusted position upon the lever.

3. In a device of the class described, the combination with a support, of a lever provided with longitudinally extending ribs on said support, and said lever provided with a sound diaphragm.

4. In a device of the class described, the combination with a support, of a springy lever provided with centrally-arranged aligned apertures and with longitudinally-extending reinforcing ribs, said apertures between said ribs, said support in one of said apertures, and said springy lever provided with a sound diaphragm.

5. In a device of the class described, the combination with a support, of a lever provided with substantially parallel reinforcing ribs, said support positioned between said ribs, and said lever provided with a sound diaphragm.

6. In a device of the class described, the combination with a support, of a lever on said support and having its outer end inturned to prevent muffling sound, and said lever provided with a sound diaphragm.

7. In a device of the class described, the combination with a support, of a lever provided with a sound diaphragm on said support, and a sound amplifier over said sound diaphragm and provided with inturned ears engaging said lever for holding the sound amplifier thereon.

8. In a device of the class described, the combination with a support, of a lever provided with a sound diaphragm and with notches contiguous to said sound diaphragm, said lever on said support, and a sound amplifier provided with ears in said notches.

9. In a device of the class described, the combination with a support, of a lever provided with a sound diaphragm mounted on said support, a sound amplifier over said sound diaphragm, and said lever and sound amplifier provided with interlocking means for holding the sound amplifier securely on said lever.

10. As a new article of manufacture, a tire deflation alarm formed from springy material and comprising a lever provided with a bent outer end adapted to engage a tire and with a sound diaphragm near said outer end, a sound amplifier interlocked upon said lever over said sound diaphragm, an adjusting bolt on said lever contiguous to said sound diaphragm, and lock nuts on said adjusting bolt and engaging opposite faces of said lever, substantially as shown and described.

In testimony whereof I hereunto affix my signature.

LEO PAUL LARO.